Patented Dec. 15, 1931

1,836,595

UNITED STATES PATENT OFFICE

ROGER B. HILL, OF BERLIN, NEW HAMPSHIRE, ASSIGNOR TO BROWN COMPANY, OF BERLIN, NEW HAMPSHIRE, A CORPORATION OF MAINE

TREATMENT OF AQUEOUS RUBBER DISPERSIONS AND PRODUCT OF SAME

No Drawing.   Application filed April 3, 1929.   Serial No. 352,328.

Aqueous rubber dispersions such as latex or artificial dispersions of crude or reclaimed rubbers are sometimes used to impregnate porous materials to impart various desirable characteristics thereto, the use of rubber in this condition doing away with fire hazard incident to the use of so-called rubber-organic solvent solutions. For example, aqueous rubber dispersions are sometimes used for the impregnation of fibrous material in the form of the yarns, cords, or fabrics, or in the form of a bibulous paper or web of cellulose fibers, such as rag or wood pulp, interfelted on machinery of the paper-making type. When a porous web of interfelted fiber is impregnated with water-dispersed rubber and the web dried and, if desired, vulcanized, it acquires leather-like characteristics, including strength, resistance to tear, water-repellency, feel, and the like. The degree to which these properties are acquired by the product depends upon the particular conditions of its manufacture, but it is possible to produce artificial leathers as described, with properties more or less simulating those of the natural product.

One of the problems arising from the use of aqueous rubber dispersions is to preserve or keep such dispersions from coagulation during transit and storage. It is well known that latex, for example, undergoes putrefaction and coagulation with ageing, unless a preservative or anti-coagulant is added thereto. This difficulty is accentuated when latex is concentrated as by the evaporation of a portion of the aqueous content naturally associated therewith in order to reduce shipping costs. It has been found possible to preserve aqueous rubber dispersions by adding a comparatively small quantity of water-soluble protective colloids such as potassium or sodium soaps or alkali caseinates thereto, the dispersions preferably being maintained in a distinctly alkaline condition by an alkali such as ammonia and potassium hydroxide. When such preserved dispersions are used to impregnate a porous material such as a web of interfelted cellulose fibers, it is found that setting or coagulation of the rubber by drying is retarded by the presence of the anti-coagulant, and that there is a tendency for the rubber particles to migrate to the surface, where evaporation of water is taking place.

I have found that if the water-soluble protective colloid is converted to a water-insoluble, non-protective condition, setting or coagulation of the dispersed rubber particles during drying may be considerably promoted and the distribution of rubber in the impregnated product made more uniform. When water-soluble soaps or caseinate are used as the anti-coagulants, their conversion to a water-insoluble non-protective condition may be effected by the addition of suitable precipitating compounds, such as neutral salts or hydroxides the metal radical of which precipitates the insoluble metal soaps or caseinates to destroy the protective function of the water-soluble protective colloid but substantially without coagulating the dispersed rubber particles. A metal compound particularly suitable for this purpose is slaked lime, though, as will later appear, other such materials may be used. For instance, if a potassium soap such as potassium oleate is used as the anti-coagulant in an aqueous rubber dispersion together with free potassium hydroxide, milk of lime may be added thereto to produce the insoluble calcium oleate, thus destroying the potassium soap used as the anti-coagulant. There may be some action by the lime on the natural anti-coagulants, such as the resins or proteins present in the aqueous medium or serum to render such anti-coagulants insoluble, but the use of too large an amount of lime should be avoided, because of the tendency to produce rubber agglomerates which cannot penetrate into the porous material which it is desired to impregnate with rubber, and the stiffening effect of the lime, which serves as a filler, upon the product. If the dispersion contains ammonia or free potassium hydroxide, which act as anti-coagulants, by too large an amount of lime, we mean that amount required to overcome the action of these anti-coagulants.

The process of the present invention may be carried out on various rubber dispersions in which water-soluble soaps or caseinates are used as the anti-coagulating or stabilizing agents. For instance, the rubber dispersion may be a concentrated natural latex having a solids content of, say, about 75% and a pasty consistency and containing, say, about 1% of potassium soap, based on the weight of the total mass, e. g., potassium oleate, and free potassium hydroxide in amount sufficient to produce a mass of about $\frac{1}{10}$ normality. The soap present in such a latex or natural dispersion is little in excess of that necessary to keep the latex stable. Before treating such a dispersion, it is preferable to dilute it with water to a solids content of, say, about 30%, as at this concentration the dispersion flows readily and permits of ready and uniform mixing with milk of lime or an aqueous solution of other heavy metal salts or hydroxides to render the potassium soap insoluble while avoiding local coagulation in the dispersion. To the diluted dispersion at room temperature, or at somewhat higher temperature if desired, may then be added with stirring milk of lime containing, say, 10% calcium oxide, based on the weight of the concentrated latex used as a raw material. The latex may then be diluted to the solids content desired for impregnation to, say, about 10% to 20% solids content, when it is to be used for the impregnation of a porous web of interfelted cellulose fiber to produce an artificial leather product. It has been found that when the web is dipped into or passed through the treated latex and subjected to drying, setting or coagulation of the rubber is considerably hastened, and the so-called "ply adhesion" or tenacity of bond between the face portions or layers of the resulting sheet is remarkably enhanced. For example, in one case using a concentrated latex after treatment as hereinbefore described for the impregnation of superposed, highly porous webs of interfelted wood fiber, it was found that the ply adhesion was increased from 50 to 275, the arbitrary units given representing the resistance to the pulling apart of the dried, rubber-impregnated sheet after it had been split. Doubtless this improved ply adhesion is attributable to the greater uniformity of rubber distribution through the dried product, which, in turn, is made possible by destroying the protective action of the soap originally present in the dispersion, so that the rubber particles coalesce quickly during the drying of the sheet and do not tend to migrate to the surface. In other words, if considerable migration of rubber to the surface of the sheet takes place during the drying operation, the center of the sheet is left relatively poorer in rubber and the sheet may easily be split apart. It further appears that the insoluble calcium soap present in the treated dispersion, not being a protective colloid and not swelling in water, may be dehydrated more easily than water-soluble soaps such as potassium oleate, so that drying of the impregnated webs is facilitated.

The example hereinbefore given is for the purpose of illustration only, as the process of the present invention may be applied when artificial dispersions of crude or reclaimed rubber containing soluble soaps or caseinates as the dispersing agents are used, or when so-called vulcanized latices containing such agents are used, in such latter case mere drying of the impregnated material resulting in a product containing vulcanized rubber, as the particles of rubber in the latex are in a vulcanized condition. Other metal compounds such as those of iron, barium, strontium, and the like may be used in lieu of those of calcium, but I prefer to use lime, not only because of its economy but because the treatment may be readily controlled to avoid coagulation of the rubber and does not result in objectionable reaction products.

I claim:

1. A substantially uncoagulated aqueous rubber dispersion containing precipitated in situ therein the water-insoluble non-protective reaction product of a water-soluble protective colloid previously added to the dispersion as a preservative.

2. A substantially uncoagulated aqueous rubber dispersion containing precipitated in situ therein the water-insoluble non-protective reaction product of a water-soluble protective colloid previously added to the dispersion as a preservative and a precipitating compound.

3. A substantially uncoagulated aqueous rubber dispersion containing precipitated in situ therein the water-insoluble non-protective reaction product of a water-soluble soap and a metal compound.

4. A substantially uncoagulated aqueous rubber dispersion containing the water-insoluble calcium soap resulting from the reaction of a water-soluble soap and lime.

5. The step of modifying the characteristics of an aqueous rubber dispersion containing previously added, water-soluble protective colloid for preserving purposes which comprises converting such colloid to a water-insoluble non-protective condition substantially without coagulating the rubber.

6. The step which comprises treating an aqueous rubber dispersion containing previously added, water-soluble protective colloid for preserving purposes with a precipitating compound to precipitate a non-protective reaction product of said colloid substantially without coagulating the rubber.

7. The step which comprises treating an aqueous rubber dispersion containing a water-soluble soap with a metal compound to precipitate a metal soap substantially without coagulating the rubber.

8. The step which comprises treating an aqueous rubber dispersion containing a water-soluble soap with lime to precipitate a calcium soap substantially without coagulating the rubber.

9. A process of modifying the characteristics of a paste-like aqueous rubber dispersion containing potassium oleate as an anticoagulant, which comprises diluting the dispersion with water to a flowable consistency, and adding milk of lime thereto to precipitate calcium oleate substantially without coagulating the rubber.

10. A substantially uncoagulated latex containing precipitated in situ therein the water-insoluble nonprotective reaction product of a precipitating compound and a water-soluble protective colloid previously added to the latex in amount little in excess of that necessary to keep the latex stable.

11. A substantially uncoagulated, aqueous rubber dispersion containing precipitated in situ therein calcium oleate resulting from the reaction of soluble oleate soap and lime.

12. A substantially uncoagulated latex containing the water-insoluble calcium soap resulting from the reaction in situ in the latex of about 1% soluble soap based on the latex, and about 10% calcium oxide based on the latex.

In testimony whereof I have affixed my signature.

ROGER B. HILL.